June 15, 1937.  A. ANDREWS  2,083,808
INTERNAL COMBUSTION ENGINE
Filed March 9, 1936  4 Sheets-Sheet 1

Inventor
Albert Andrews
By H. B. Willson &co
Attorneys

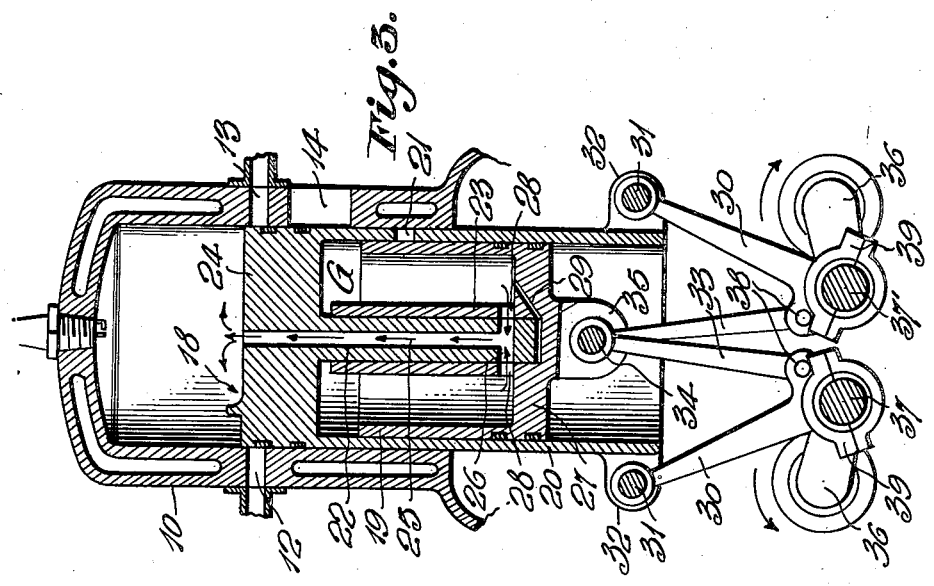
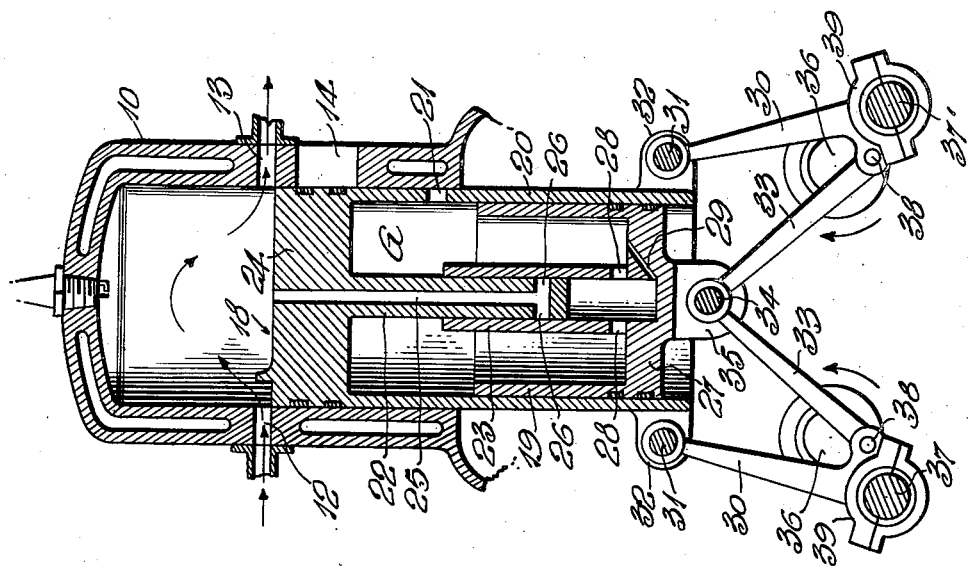

June 15, 1937.  A. ANDREWS  2,083,808
INTERNAL COMBUSTION ENGINE
Filed March 9, 1936   4 Sheets-Sheet 3
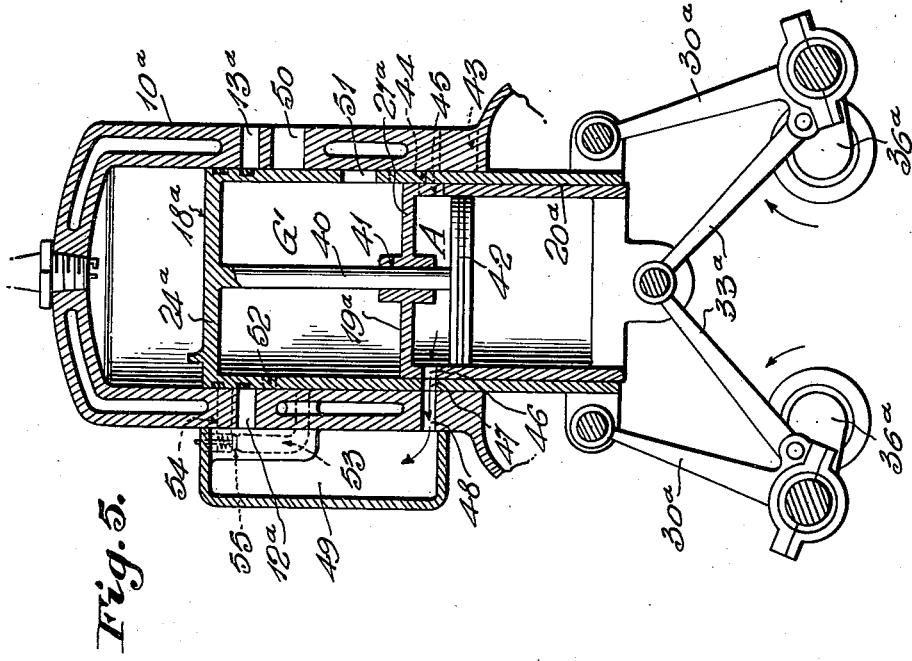
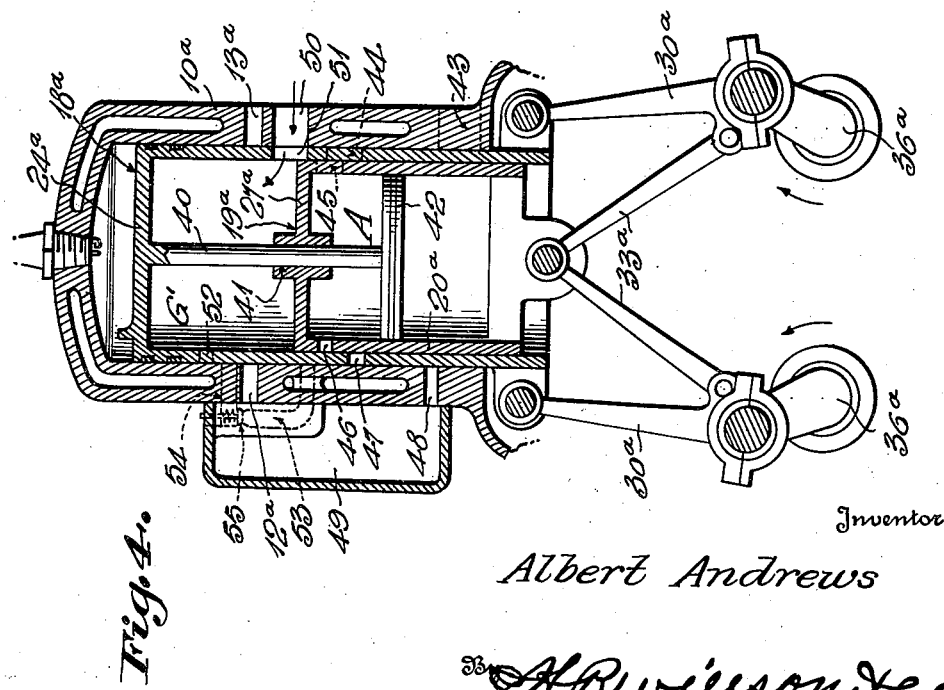
Inventor
Albert Andrews June 15, 1937.  A. ANDREWS  2,083,808
INTERNAL COMBUSTION ENGINE
Filed March 9, 1936   4 Sheets-Sheet 4
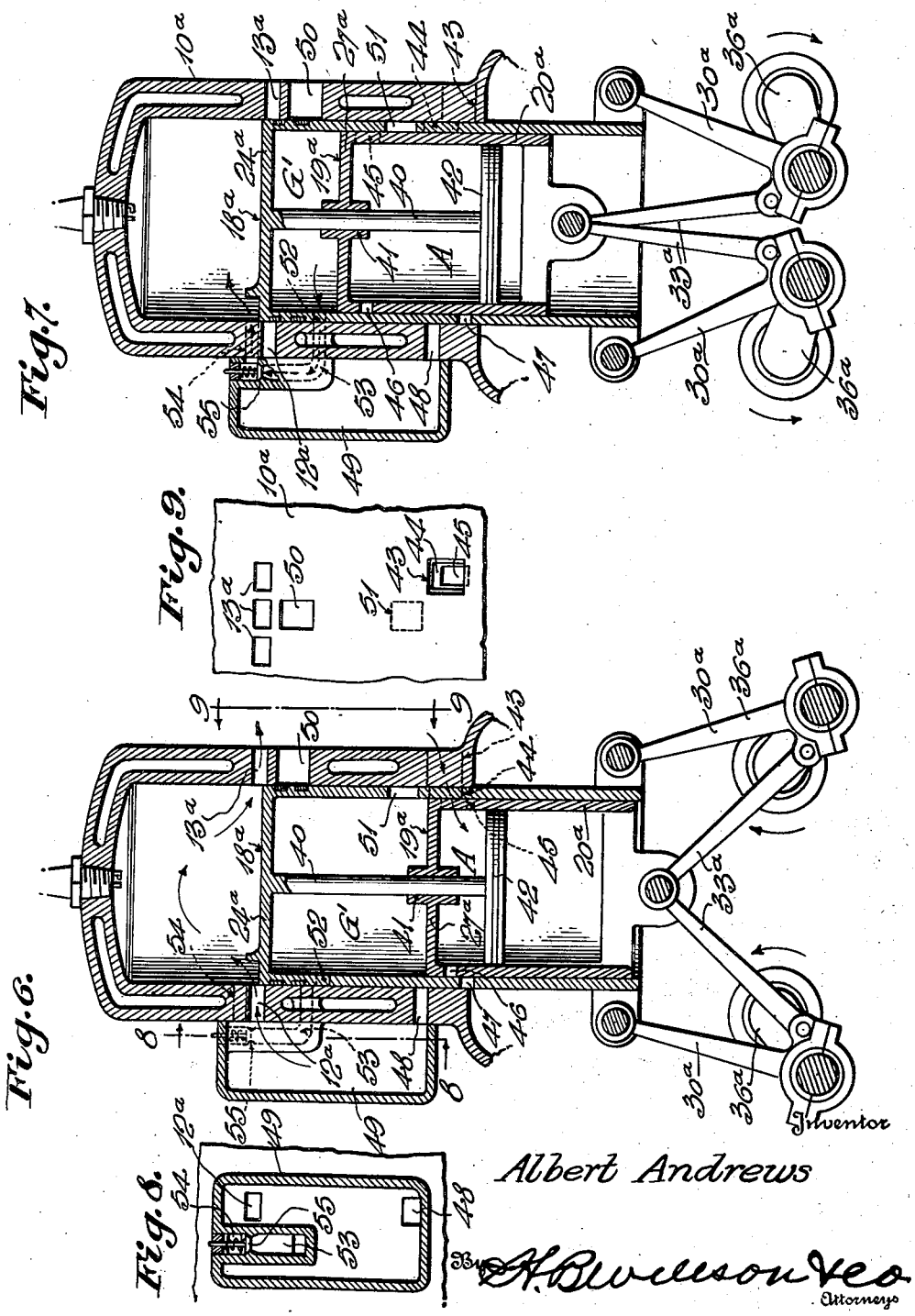
Inventor
Albert Andrews Patented June 15, 1937

2,083,808

UNITED STATES PATENT OFFICE 2,083,808

INTERNAL COMBUSTION ENGINE

Albert Andrews, Deadwood, S. Dak.

Application March 9, 1936, Serial No. 67,977

10 Claims. (Cl. 123—69)

The present disclosure of the invention relates to an internal combustion engine of the general type in which an inner piston reciprocates in a main piston while the latter reciprocates in a cylinder, the two pistons co-operating in forming a pump for compressing a gas. This gas may be an explosive gas for firing in the cylinder or it may be simply air for scavenging the cylinder or for use in some other capacity.

With little change, the same general structure may be used not as an engine but solely as a gas compressor and the invention is not therefore to be considered as limited to engines alone.

The principal object of the invention is to provide an improved structure in which the co-acting pump-forming pistons are properly synchronized and held against slapping.

Another object, in one form of the invention, is to provide a unique means for conducting compressed gas from the pump into the cylinder.

A further object, in a second form of the invention, is to provide a novel construction wherein two pumps are provided, and in an engine, one of these pumps may handle the explosive gas and the other air for scavenging purposes, or they may perform other duties.

Still further objects are to provide for simple and inexpensive well balanced construction, high efficiency and maximum durability.

With the foregoing in view, the invention resides in the novel subject matter hereinafter described and claimed, the description being accomplished by reference to the accompanying drawings.

Fig. 2 is a fragmentary view similar to Fig. 1 but illustrating the parts in position for discharging exhaust gases from the cylinder.

Fig. 3 is a view similar to Fig. 2 but illustrating the parts positioned to discharge compressed gas from the pump into the cylinder for further compression and firing in the latter.

Fig. 4 is a vertical sectional view through another form of internal combustion engine constructed in accordance with the invention and embodying both a gas pump and an air pump, the parts being shown in position for admitting gas to said gas pump.

Fig. 5 is a view similar to Fig. 4 but showing the parts positioned for discharging air from the air pump for subsequent passage into the cylinder to scavenge the same.

Fig. 6 is a view similar to Fig. 5 but illustrating the relation of parts when the scavenging air enters the cylinder, also showing the manner in which the air enters the air pump.

Fig. 7 is a similar view showing the parts positioned for discharging compressed gas from the pump into the cylinder for further compression and firing in the latter.

Fig. 8 is a detail vertical section on line 8—8 of Fig. 6.

Fig. 9 is a fragmentary elevation as indicated by line 9—9 of Fig. 6.

Figure 1:
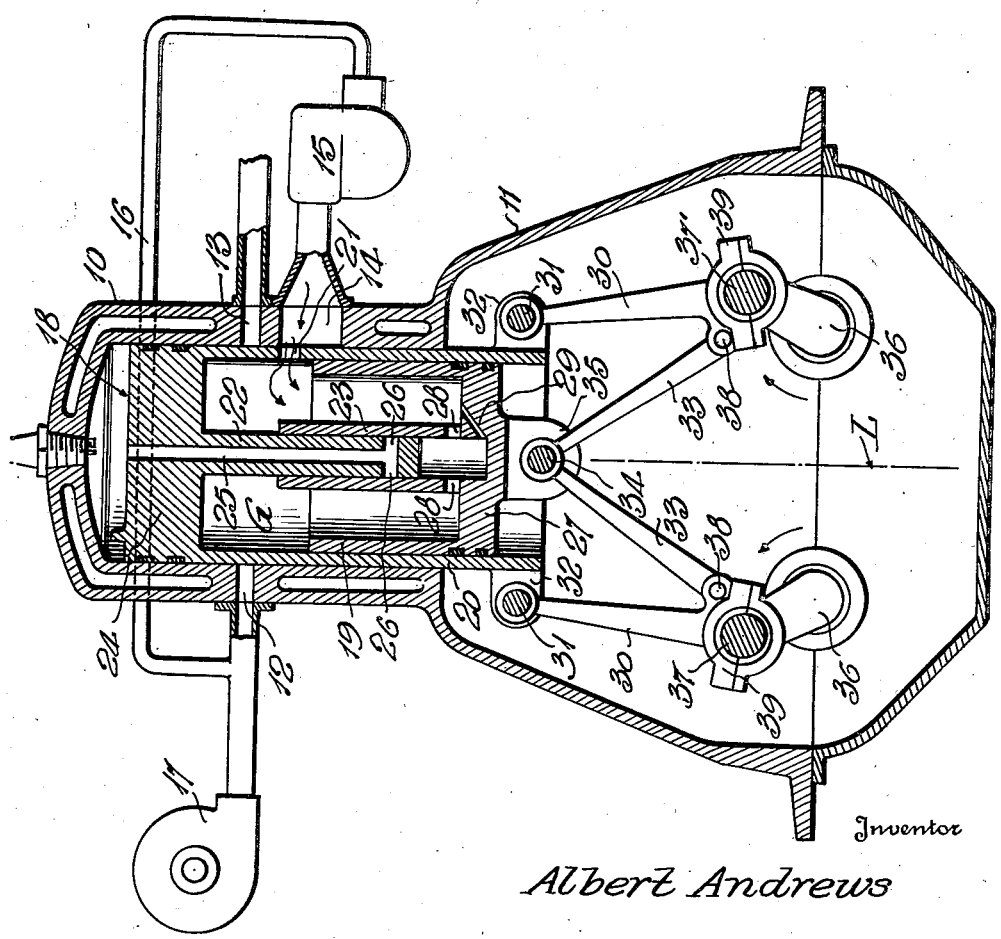
Fig. 1 is a vertical transverse sectional view through an internal combustion engine constructed in accordance with the invention and having one gas pump, the parts being shown in position for admitting gas to the pump.

The construction shown in Figs. 1, 2 and 3 will first be described. In these views, 10 denotes an appropriate cylinder carried by a crank case 11, said cylinder being provided with a scavenging air inlet 12, with an exhaust gas discharge port 13 and with a gas admission port 14. The port 14 communicates with an appropriate carbureter 15 to which an air line 16 extends for supercharging purposes in the present disclosure. The fan, blower or the like 17 which feeds air to the line 16, is also in communication with the port 12 to supply the scavenging air.

A main piston 18 is provided within the cylinder 10, and a second piston 19 is mounted for reciprocation in the skirt 20 of said main piston. Provision is made for reciprocating the piston 19 within the piston 18 as the latter reciprocates in the cylinder 10, whereby the two pistons may coact in forming a gas pump G. Gas is admitted to this pump from the port 14, through a gas admission port 21 in the skirt 20, and novel provision is made for discharging compressed gas from said pump into the cylinder 10 (see Fig. 3) immediately after the scavenging of the cylinder (Fig. 2). In providing for conducting the compressed gas from the pump G into the cylinder 10, I provide a central stem 22 on one of the pistons, a sleeve 23 slidably receiving said stem and carried by the other piston, and periodically communicating ports in said stem and sleeve. In the present showing, the stem 22 is carried by the head 24 of the main piston 18 and said stem is provided with a central gas conducting port 25 and with two lateral gas conducting ports 26 communicating with the lower end of said port 25. The sleeve 23 is carried by the head 27 of the piston 19 and is formed with ports 28 for communication at the proper time with the ports 26 (see Fig. 3). To prevent trapping of gas between the stem 22 and the piston head 27 when the pistons move into the relation shown in Fig. 3, a gas escape port 29 may be provided.

Two main rods 30 are disposed at opposite sides of a line L which is coaxial with the pistons 18 and 19, the upper ends of said rods being pivoted on laterally spaced axes 31, to the lower end of said piston 18, lugs 32 being shown to carry the wrist pins or the like. Two additional rods 33 are disposed in diverging relation with the rods 30, said rods 33 being disposed primarily between said rods 30 and being pivoted at 34 to the inner piston 19, the piston head 27 being provided with lugs 35 to carry the wrist pin or other connection. Two oppositely rotatable crank shafts 36 are provided, said crank shafts being disposed at opposite sides of the line L. Both rods 30 and 33 at one side of this line L, are operatively connected with one crank 37 of the crank shaft at said one side of said line. The other two rods 30 and 33 are operatively connected with one crank 37' of the crank shaft at the opposite side of the line L. In the present showing, the rods 33 are pivoted at 38 to the bearings 39 of said rods 30, but if desired, said rods 33 could be provided with bearings operating on the cranks 37 and 37' respectively. By the construction shown, however, one connecting rod bearing suffices for each pair of rods 30, 33.

The arrangement of crank shafts and rods above described, not only produces proper reciprocation of the piston 19 in the piston 18 as the latter reciprocates in the cylinder 10, but provides a well balanced construction in which both of the pistons are held against slapping. Any lateral thrusts exerted by one of the rods 30 upon the main piston 18, is counteracted by a corresponding lateral thrust in the other direction, exerted by the other rod 30. Similarly, any lateral thrust exerted on the inner piston 19 by one of the rods 33, is counteracted by the opposed lateral thrust of the other rod 33. Also, the arrangement of crank shafts, rods and pistons, so connects the two crank shafts 36 that they are constrained to rotate simultaneously in opposite directions, even if no other connecting means be provided between said shafts.

When the cylinder 10 fires, the ports 14 and 21 are open as seen in Fig. 1 and as the piston 18 descends, the cranks and rods 33 draw the piston 19 rapidly downward within said piston 18 to fill the pump G with explosive gas. When port 21 descends below port 14, admission of gas is cut off and before said port 21 again reaches port 14 upon ascent of the piston 18, piston 19 gas ascended and closed said port 21 as will be clear from Fig. 3. When the piston 18 reaches the limit of its descent, it uncovers the ports 12 and 13 (Fig. 2) with the result that scavenging air enters the cylinder and drives out the exhaust gases. As piston 18 now ascends, piston 19 ascends with much greater rapidity, compressing the gas in the pump G. When piston 19 has reached the limit of its upward movement with respect to piston 18, the ports 26 have communicated with the ports 28 as seen in Fig. 3, discharging the compressed gas from the pump into the cylinder 10. In this cylinder, the gas is further compressed by the ascent of the piston 18, the compressed gas being fired to start another cycle.

In Figs. 4 to 9 showing a double pump construction, a main piston 18ª slides within a cylinder 10ª and a second piston 19ª slides within said piston 18ª, said piston 18ª being connected by rods 30ª with cranks of two crank shafts 36ª and said piston 19ª being connected with said cranks by rods 33ª, the arrangement of rods and crank shafts being the same as above described, for producing relative movement of the two pistons.

A piston rod 40 is secured to the head 24ª of the piston 18ª and passes slidably through an opening 41 in the head 27ª of the second piston 19ª. A third piston 42 is secured to the lower end of the rod 40 and operates within the skirt 20ª of the piston 19ª. Thus, the three pistons cooperate in forming an upper gas pump G' and a lower air pump A. Air is admitted to the air pump A (Fig. 6) through a port 43 in the cylinder 10ª, a port 44 in the piston 18ª and a port 45 in the piston 19ª. Air is discharged from this air pump (see Fig. 5) through a port 46 in the piston 19ª, a port 47 in the piston 18ª, and a port 48 in the cylinder 10ª. The air so discharged is received in a chamber 49 at the exterior of the cylinder and from this chamber, air is discharged (see Fig. 6) through a port 12ª into the cylinder 10ª while the exhaust gas escape port 13ª stands open, thereby scavenging the cylinder. Both ports 12ª and 13ª are controlled by the main piston 18ª.

Gas enters the gas pump G' from the carbureter (see Fig. 4) through a port 50 in the cylinder 10ª, and a port 51 in the main piston 18ª. Gas discharges from this gas pump G' (see Fig. 7) through a port 52 in the main piston 18ª into a U-shaped port 53 in the cylinder 10ª, the upper end of said port 53 serving to conduct the discharged gas into said cylinder 10ª above the piston 18ª so that ascent of this piston can further compress the gas for firing. The port end 54 is opened by the piston 18ª before the exhaust gas escape port 13ª is opened and I therefore provide a check valve 55 in the port 53 to prevent any burning gases from flowing through said port into the gas pump.

The various ports above described are controlled by the movements of the pistons to handle the air and gas as required. As the cylinder fires (Fig. 4), the gas pump G' is admitting gas and continues to do so as the piston 18 descends. During the descent of this piston 18ª, the second piston 19ª coacts with the third piston 42 (Fig. 5) to compress air in the air pump A, this air being discharged through the ports 46, 47 and 48 (Fig. 5) into the chamber 49, which chamber momentarily holds the compressed air until the port 12ª is opened by the piston 18ª simultaneously with opening of the exhaust port 13ª (Fig. 6). When this occurs, the compressed air enters the cylinder 10ª to scavenge the same. Simultaneously with this operation, air is entering the air pump through the ports 43, 44 and 45 (Fig. 6). As piston 18ª starts now to ascend, piston 19ª ascends very rapidly in said piston 18ª, compressing the previously received gas in the pump G and eventually forcing this gas through the ports 52 and 53, past the check valve 55 and into the cylinder 10ª above piston 18ª. Thus, as this piston further ascends, the gas is more highly compressed in readiness for firing to start another cycle.

It will be seen from the foregoing that novel and advantageous construction has been provided for carrying out the objects of the invention. It will be understood however that the present disclosure is illustrative rather than limiting.

I claim:—

1. In a machine of the class described, a cylinder, a main piston therein, a second piston within said main piston, two main rods disposed at opposite sides of a line coaxial with said pistons, said main rods being pivoted on laterally spaced axes to said main piston, two additional rods in diverging relation with said main rods and pivoted to said second piston, and two oppositely rotatable crank shafts disposed at opposite sides of the aforesaid line, the main and additional rods at one side of said line being operatively connected with one crank of the crank shaft at said one side of said line, the other main and additional rods being operatively connected with one crank of the other crank shaft, said rods and crank shafts being operative to cause relative reciprocation of said pistons as the main piston reciprocates in the cylinder, whereby said pistons may coact in forming a pump, means for admitting a gas to said pump, and means for discharging the gas from said pump.

2. In a machine of the class described, a cylinder, a main piston therein, a second piston within said main piston, two main rods disposed at opposite sides of a line coaxial with said pistons, said main rods being pivoted on laterally spaced axes to said main piston, two additional rods in diverging relation with said main rods and pivoted to said second piston, and two oppositely rotatable crank shafts disposed at opposite sides of the aforesaid line, the main and additional rods at one side of said line being operatively connected with one crank of the crank shaft at said one side of said line, the other main and additional rods being operatively connected with one crank of the other crank shaft, said rods and crank shafts being operative to cause relative reciprocation of said pistons as the main piston reciprocates in the cylinder, whereby said pistons may coact in forming a pump, means for admitting explosive gas to said pump, means for conducting compressed gas from said pump into said cylinder for further compressing and firing therein, and exhaust gas discharge means for said cylinder.

3. In a machine of the class described, a cylinder, a main piston therein having a cylindrical skirt, a second piston in said skirt of said main piston, a stem carried by one of said pistons and of considerably less diameter than the same, a sleeve slidably receiving said stem, said sleeve being carried by the other piston and being of considerably less diameter than the same, means for reciprocating said second piston in said main piston as the latter reciprocates in said cylinder, whereby the two pistons may coact in forming a gas pump, means for admitting a gas to said pump, said stem and sleeve being provided with periodically communicating ports for conducting compressed gas from said pump into said cylinder for further compression, and gas discharge means for said cylinder.

4. In a machine of the class described, a cylinder, a main piston therein having a cylindrical skirt, a second piston in said skirt of said main piston, a stem carried by one of said pistons and of considerably less diameter than the same, a sleeve slidably receiving said stem, said sleeve being carried by the other piston and being of considerably less diameter than the same, means for reciprocating said second piston in said main piston as the latter reciprocates in said cylinder, whereby the two pistons may coact in forming an explosive gas pump, means for admitting a gas to said pump, said stem and sleeve being provided with periodically communicating ports for conducting compressed gas from said pump into said cylinder for further compression and firing therein, and exhaust gas discharge means for said cylinder.

5. In a machine of the class described, a cylinder, a main piston therein having a cylindrical skirt, a second piston in said skirt of said main piston, a stem carried by one of said pistons and of considerably less diameter than the same, a sleeve slidably receiving said stem, said sleeve being carried by the other piston and being of considerably less diameter than the same, means for reciprocating said second piston in said main piston as the latter reciprocates in said cylinder, whereby the two pistons may coact in forming a gas pump, said main piston and cylinder being provided with periodically communicating ports for admitting explosive gas to said pump; said stem and sleeve being provided with periodically communicating ports for conducting the compressed explosive gas from said pump into said cylinder for further compression and firing therein; said cylinder being provided with an exhaust port controlled by said main piston.

6. In a machine of the class described, a cylinder, a main piston therein, a second piston in said main piston having an opening in its head, a piston rod secured to the head of said main piston and passing slidably through said opening, a third piston in said second piston and secured to said piston rod, two main rods disposed at opposite sides of a line coaxial with said pistons, said main rods being pivoted on laterally spaced axes to said main piston, two additional rods in diverging relation with said main rods and pivoted to said second piston, and two oppositely rotatable crank shafts disposed at opposite sides of the aforesaid line, the main and additional rods at one side of said line being operatively connected with one crank of the crank shaft at said one side of said line, the other main and additional rods being operatively connected with one crank of the other crank shaft, said rods and crank shafts being operable to reciprocate said second piston with respect to said third and main pistons as the latter reciprocates in the cylinder, whereby said pistons may coact in forming two pumps, gas admission means for said pumps, and gas discharge means therefor.

7. In a machine of the class described, a cylinder, a main piston therein, a second piston in said main piston having an opening in its head, a piston rod secured to the head of said main piston and passing slidably through said opening, a third piston in said second piston and secured to said piston rod, means for reciprocating said second piston with respect to said third piston and said main piston as the latter reciprocates in said cylinder, whereby said second piston may coact with said main piston and said third piston in forming two pumps, gas admission means for these pumps, and gas discharge means therefor.

8. In a machine of the class described, a cylinder, a main piston therein, a second piston in said main piston having an opening in its head, a piston rod secured to the head of said main piston and passing slidably through said opening, a third piston in said second piston and secured to said piston rod, means for reciprocating said second piston with respect to said third piston and said main piston as the latter reciprocates in said cylinder, whereby said second piston may coact with said main piston and said third piston in forming two pumps, means for admitting a gas to one of said pumps, means for conducting compressed gas from this pump to said cylinder for further compression in the latter, gas discharge means for said cylinder, means for admitting a gas to the other of said pumps, and means for discharging compressed gas from this pump.

9. In a machine of the class described, a cylinder, a main piston therein, a second piston in said main piston having an opening in its head, a piston rod secured to the head of said main piston and passing slidably through said opening, a third piston in said second piston and secured to said piston rod, means for reciprocating said second piston with respect to said third piston and said main piston as the latter reciprocates in said cylinder, whereby said second piston may coact with said main piston and said third piston in forming two pumps, means for admitting explosive gas to one of said pumps, means for conducting compressed explosive gas from this pump to said cylinder for further compression and firing in the latter, exhaust gas escape means for said cylinder, means for admitting air to the other of said pumps, and means for discharging compressed air from said other pump into said cylinder while said exhaust gas escape means is open, to scavenge the cylinder.

10. In a machine of the class described, a cylinder, a main piston therein, a second piston in said main piston having an opening in its head, a piston rod secured to the head of said main piston and passing slidably through said opening, a third piston in said second piston and secured to said piston rod, means for reciprocating said second piston in said main piston as the latter reciprocates in said cylinder, whereby said second piston may coact with said main piston and said third piston in forming an air pump and a gas pump; said main piston and said cylinder being provided with periodically communicating gas admission ports for admitting explosive gas to said gas pump, said cylinder, said main piston and said second piston being provided with periodically communicating air admission ports for admitting air to said air pump; means including periodically communicating gas discharge ports in said cylinder and said main piston for conducting compressed explosive gas from said gas pump into said cylinder for further compression and firing therein; said cylinder being provided with an exhaust gas escape port controlled by said main piston; and means including periodically communicating air ports in said cylinder, said main piston, and said second piston for conducting compressed air from said air pump to said cylinder while said exhaust gas escape port is open.

ALBERT ANDREWS.